US007353515B1

(12) United States Patent
Ton et al.

(10) Patent No.: US 7,353,515 B1
(45) Date of Patent: Apr. 1, 2008

(54) METHOD AND APPARATUS FOR DYNAMIC ALLOCATION AND MANAGEMENT OF SEMAPHORES FOR ACCESSING SHARED RESOURCES

(75) Inventors: Huy Thatminh Ton, San Jose, CA (US); Prabhakara R. Yellai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 809 days.

(21) Appl. No.: 09/776,794

(22) Filed: Feb. 4, 2001

(51) Int. Cl.
*G06F 9/46* (2006.01)
(52) U.S. Cl. ...................... 718/102; 718/100; 718/104; 718/106
(58) Field of Classification Search ......... 718/100–108
See application file for complete search history.

(56) References Cited

U.S. PATENT DOCUMENTS

| | | | | |
|---|---|---|---|---|
| 4,104,718 | A * | 8/1978 | Poublan et al. ................. | 707/8 |
| 4,965,718 | A * | 10/1990 | George et al. ............... | 718/104 |
| 5,050,088 | A * | 9/1991 | Buckler et al. ................ | 700/96 |
| 5,872,980 | A | 2/1999 | Derrick et al. | |
| 6,237,019 | B1 | 5/2001 | Ault et al. | |
| 6,457,098 | B1 * | 9/2002 | DeKoning et al. .......... | 711/114 |
| 6,532,487 | B1 * | 3/2003 | Perks .......................... | 718/106 |
| 6,546,443 | B1 * | 4/2003 | Kakivaya et al. ........... | 710/200 |
| 2002/0078119 | A1 * | 6/2002 | Brenner et al. ............. | 709/102 |

OTHER PUBLICATIONS

Silberschatz, Abraham, and Galvin, Peter Baer. Operating System Concepts, 1999, John Wiley & Sons, Inc., Fifth Edition, pp. 115 and 242.*

C.A.R. Hoare, "Monitors: An Operating System Structuring Concept," Communications of the ACM, vol. 17, No. 10, Oct. 1974, pp. 549-557.

Soren Lauesen and Nordisk Brown Boveri, "A Large Semaphore Based Operating System," Communications of the ACM, vol. 18. No. 7, Jul. 1975, pp. 377-389.

VxWorks Programmer's Guide, 5.3.1, Edition 1, Wind River Systems, Inc., Alameda, CA Mar. 4, 1997, pp. 57-73.

VxWorks Reference Manual, 5.3.1, Edition 1, Wind River Systems, Inc., Alameda, CA Feb. 21, 1997, pp. 290-302, 399-402, 550-567, 827-829, 845-848, and 858-866.

* cited by examiner

*Primary Examiner*—Meng-Al T. An
*Assistant Examiner*—Kenneth Tang
(74) *Attorney, Agent, or Firm*—The Law Office of Kirk D. Williams

(57) ABSTRACT

Methods and apparatus are disclosed for dynamic allocation and management of semaphores for accessing shared resources. In one implementation, a semaphore manager maintains a data structure of resources having currently active resource requests and a list of each task requesting access and the particular type of access requested. When an access request is received for the first time for a resource, an entry is added to the data structure and access is authorized. Additional requests to access the resource may be received while the resource is allocated. If a new request for read access is received and the resource is currently under read access, access is granted and an entry is added to the data structure. Otherwise, the resource is currently unavailable, and access is either immediately denied or queued for possible future allowance during a specified, predetermined or forever duration.

6 Claims, 11 Drawing Sheets

| | 410 ↓ | 411 ↓ | 412 ↓ | 413 ↓ |
|---|---|---|---|---|
| 400 | RESOURCE NAME | LOCK TYPE | SEMAPHORE INDEX | READ LOCK COUNT |
| 401 — 1 | | | | |
| 402 — 2 | | | | |
| 403 — 3 | | | | |
| ⋮ | | | ● ● ● | |
| 409 — R | | | | |

RESOURCE LOCK TABLE

FIGURE 4A

SEMAPHORE ALLOCATION TABLE

METHOD AND APPARATUS FOR DYNAMIC ALLOCATION AND MANAGEMENT OF SEMAPHORES FOR ACCESSING SHARED RESOURCES

FIELD OF THE INVENTION

This invention relates coordinating access to resources shared among tasks of computer and/or communications systems and devices; and more particularly, the invention relates to the dynamic allocation and management of semaphores for accessing shared resources.

BACKGROUND OF THE INVENTION

In many computer and communications systems and applications, resources must be shared among multiple tasks in a computer or communications systems. Semaphores are a well-known tool for use in controlling access to shared resources, and many operating systems and programming environment provide such semaphore mechanisms. However, known approaches require tasks to have knowledge of a particular semaphore and its association to the desired resource. This typically is achieved during the programming of the particular tasks which requires a coordinated implementation among the various tasks. For example, one task might be programmed to create a semaphore having a predefined identifier for a particular resource, with this information shared among other tasks so these other tasks use the appropriate semaphore. This can become a programming nightmare, as programmers of these tasks typically must track the use of semaphores and use the same semaphore identifier. Moreover, these semaphores are typically allocated during the programming of the tasks, and thus each resource which may be shared, will have a semaphore assigned to it. In many systems, only a small number of tasks may share a small number of the total sharable resources. Requiring each resource that may be shared to be allocated a semaphore during programming is a waste of resources. Needed are new methods and systems for creating and managing semaphores among tasks of a computer or communications system.

SUMMARY OF THE INVENTION

Systems and methods are disclosed for dynamic allocation and management of semaphores for accessing shared resources. One embodiment maintains a data structure indicating for each of multiple resources an allocated semaphore. A request to access a first resource is received from a first task. After determining that the first resources is available, the embodiment allocates a first semaphore and updates the data structure with the first resource and an indication of the first semaphore. The embodiment signals to the first task that the first request is available.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 4A is a block diagram of an embodiment of a resource lock table;

DETAILED DESCRIPTION

Figure 1:
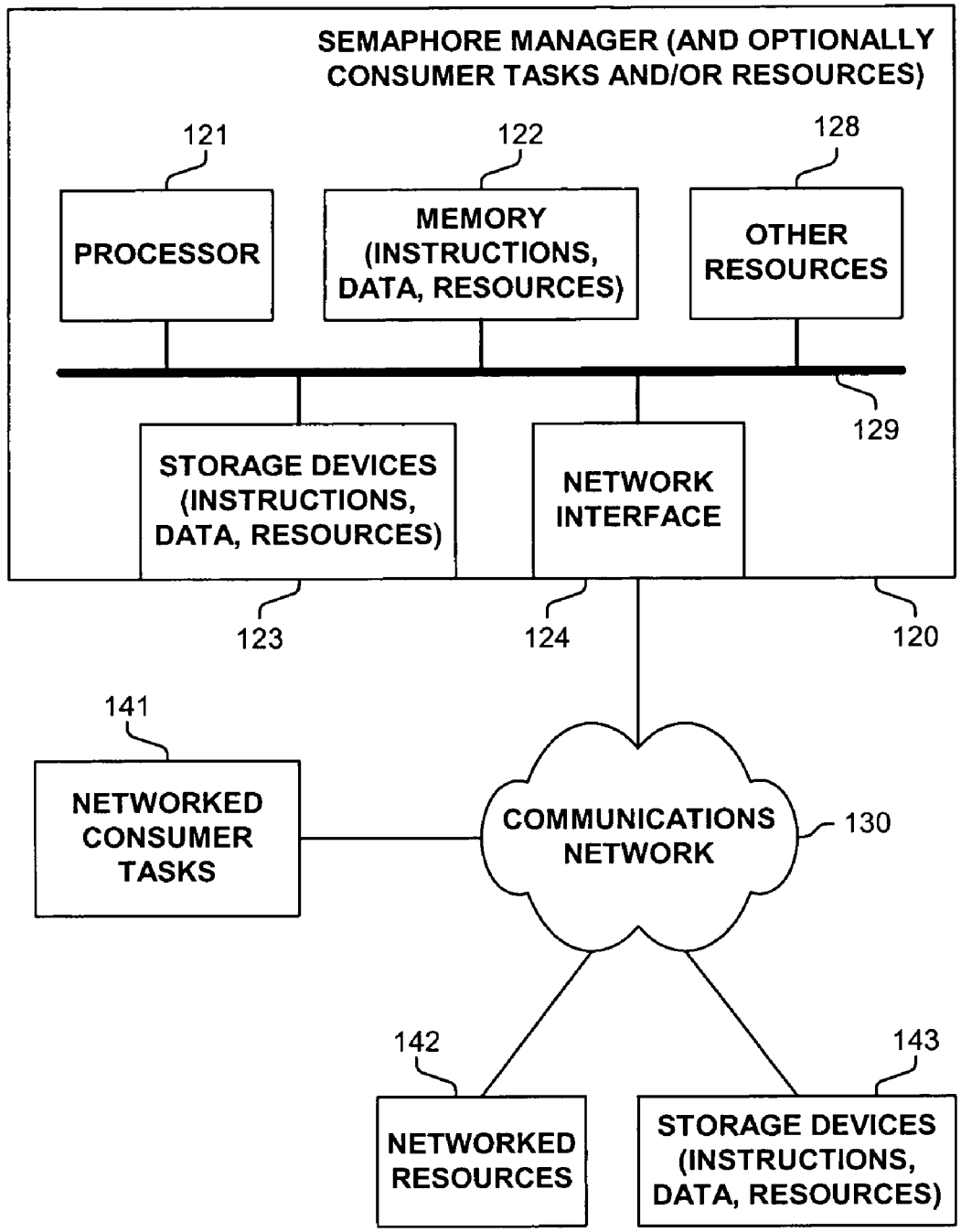
FIG. 1 is a block diagram of an embodiment for dynamically allocating and managing semaphores for accessing shared resources.

Methods and apparatus are disclosed for dynamic allocation and management of semaphores for accessing shared resources. Methods and apparatus disclosed herein in accordance with the invention are not limited to a single computer, computing platform, operating system, router, or communications architecture, etc. Rather, the architecture and functionality taught herein are extensible to an unlimited number of systems, devices and embodiments in keeping with the scope and spirit of the invention. Embodiments described herein include various elements and limitations, with no one element or limitation contemplated as being a critical element or limitation. Each of the claims individually recite an aspect of the invention in its entirety. Moreover, some embodiments described may include, inter alia, systems, devices, methods, and computer-readable medium containing instructions. The embodiments described herein embody various aspects and configurations within the scope and spirit of the invention.

As used herein, the term "system" is used generically herein to describe any number of devices, computers, routers, networks, computer and/or communication devices or mechanisms, components or combinations thereof. The term "computer" is used generically herein to describe any number of computers, including, but not limited to personal computers, embedded processors, ASICs, chips, workstations, mainframes, etc. The term "device" is used generically herein to describe any type of mechanism, including a computer or system or component thereof. The term "task" is used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating address spaces, a routine of a library and/or standalone application, and is not limited to any particular memory partitioning technique. The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units.

Methods and apparatus are disclosed for dynamic allocation and management of semaphores for accessing shared resources. These resources may be part of a computer or communications system or a network, such as, but not limited to a disk drive, printer, memory, file, database, code, data, etc., that can be allotted to a task while it is running. In one embodiment, a semaphore manager maintains a data structure of resources having currently active resource requests and a list of each task requesting access and the particular type of access requested. When an access request is received for the first time for a resource, an entry is added to the data structure and access is authorized. Additional exclusive or non-exclusive access requests to access the resource may be received while the resource is already subject to access control. In one embodiment, if a new request for non-exclusive (e.g., read) access is received and the resource is currently under non-exclusive access, access is granted and an entry is added to the data structure. Otherwise, the resource is currently unavailable, and access is either immediately denied or queued for possible future allowance during a specified, predetermined or forever duration. In one embodiment, the semaphore manager uses semaphore primitives provided by an underlying operating system and assigns each resource request a semaphore received from the operating system. These semaphore values are maintained in the data structure, and may be used by the semaphore manager for fulfilling or timing out queued access requests. In this manner, access requests are made by a task based on an identifier of the resource (and not an identifier of a semaphore), and semaphores are dynamically allocated at runtime and only for those resources which are actually used.

FIG. 1 illustrates an exemplary embodiment and operating environment of the invention. Semaphore manager 120, which may also include one or more consumer tasks and/or resources, dynamically allocates and manages the semaphores for accessing resources, such as those resources internal to a system including semaphore manager 120 (e.g., memory 122, storage devices 123, network interface 124, other resources 123), and those external resources (e.g., networked resources 142 and networked storage devices 143). These resources may be part of a computer or communications system or a network, such as, but not limited, a disk drive, printer, memory, file, database, code, data, etc., that can be allotted to a task while it is running. The consumer tasks which will request access to and use one or more of these resources may also reside on the computer or communications platform including semaphore manager 120, or be external to such platform (e.g., networked consumer tasks 141).

Semaphore manager 120 typically comprises a standard or a specialized computer or communications platform, including, but not limited to one or more supercomputers, mainframes, servers, multiprocessor computers, workstations, desktop computers, laptop computers, personal data assistants, handheld computers, telephones, etc. Semaphore manager 120 may also be a component of a larger system. Semaphore manager 120 may only include some of the elements 121, 122, 123, 124 and 128 and/or use different elements to provided the functionality described herein. For purposes of simplicity of illustration, only one semaphore manager 120 is shown. However, the number of semaphore managers, operating independently or in a distributed and coordinated fashion supported by the invention is unbounded.

In an embodiment, semaphore manager 120 comprises a processor 121, memory 122, storage devices 123, other resources 128 and a network interface 124, which are electrically coupled via one or more communications mechanisms 129 (shown as a bus for illustrative purposes.) In one embodiment, consumer tasks, resources and the dynamic allocation of these resources to these consumers is performed internally within semaphore manager 120. While in other embodiments, consumer tasks and resources may be external to semaphore manager 120, in which case, network interface 124 may be connected to a communications network 130 (e.g., one or more networks, including, but not limited to the Internet, private or public telephone, cellular, wireless, satellite, cable, local area, metropolitan area and/or wide area networks).

Memory 122 is one type of computer-readable medium, and typically comprises random access memory (RAM), read only memory (ROM), integrated circuits, and/or other memory components. Memory 122 typically stores computer-executable instructions to be executed by processor 121 and/or data which is manipulated by processor 121 for implementing functionality in accordance with the invention. Storage devices 123 are another type of computer-readable medium, and typically comprise disk drives, diskettes, networked services, tape drives, and other storage devices. Storage devices 123 typically store computer-executable instructions to be executed by processor 121 and/or data which is manipulated by processor 121 for implementing functionality in accordance with the invention.

Semaphore manager 120, networked consumer tasks 141, networked resources 142, networked storage devices 143, and communications network 130 may also be implemented as part of a single computer or communications platform, with communications network 130 being an internal information sharing mechanism such as message passing or shared memory. Additionally, while not shown for simplicity of illustration for the reader, networked consumer tasks 141, networked resources 142, and/or networked storage devices 143 typically contain one or more processors and computer-readable medium (e.g., memory, storage devices, etc.).

As used herein and contemplated by the invention, computer-readable medium is an extensible term including, but not limited to, memory, storage device(s), and/or other storage mechanism(s).

Figure 2:
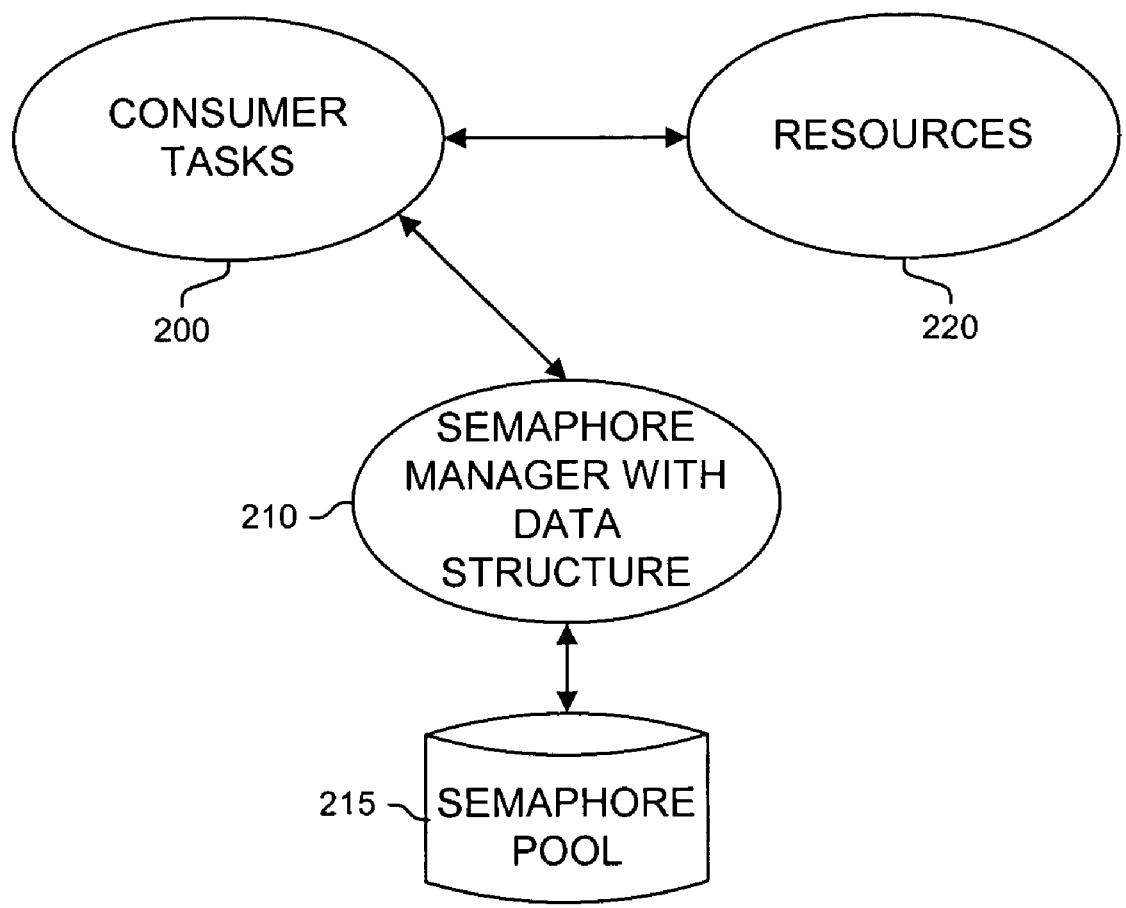
FIG. 2 is a logical diagram of one embodiment for dynamically allocating and managing semaphores for accessing shared resources.

FIG. 2 illustrates one embodiment of a system which dynamically allocates resources to consumers. Consumer tasks 200 request from semaphore manager 210 access to one or more resources 220. In one embodiment, semaphore manager 210 maintains a data structure indicating allocated resources. When access to a specified resource 220 is requested by a consumer task 200, semaphore manager 210 may acquire a semaphore from semaphore pool 215 and dynamically associate the acquired semaphore with the requested resource 220 (and possibly return semaphores which are no longer used to semaphore pool 215). The requested resource 220 may or may not be available for the desired action (e.g., read or write). If access is available, semaphore manager 210 will signal via some communications mechanism (e.g., by returning a value, message passing, interprocess communication, memory sharing, etc.) to consumer task 200 to proceed with accessing the resource 220. Otherwise, semaphore manager 210 may signal to consumer task 200 that access is denied, or queue the access request for a limited or unlimited duration (which may be specified by a consumer task 200 or be some predetermined duration). Upon a timeout of such a queued access request, semaphore manager 210 may signal to consumer task 200 that access is denied. Upon a requested resource 220 becoming available for which a queued access request exists, semaphore manager 210 may grant access for the requested resource 220 to the requesting consumer task 200, and signal to requesting consumer task 200 that access is now allowed.

Figure 3:
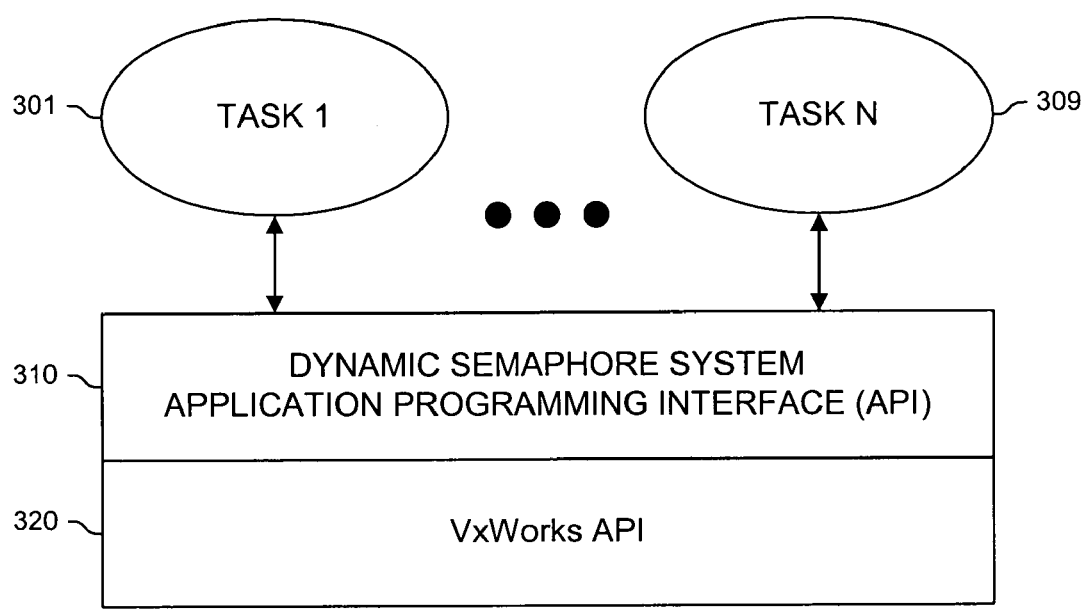
FIG. 3 is a block diagram of one embodiment including a dynamic semaphore system application programming interface (API)

FIG. 3 illustrates one embodiment of a system for dynamic allocation and management of semaphores for accessing shared resources. Multiple user tasks 301-309 request access to resources (such as the resources illustrated in FIG. 1) by calling a dynamic semaphore system application programming interface (API) 310 which allocates and manages semaphores for accessing the resources. In one embodiment, dynamic semaphore system API 310 uses VxWorks API 320 or other semaphore primitives provided by an underlying operating system. Dynamic semaphore system API 310 may reside on top of any operating system including, but not limited to, VxWorks, Unix, Solaris, Windows NT or other Windows operating system, Linux, VMS, AIX, Tru-64, HP-UX, etc. Depending on the semaphore primitives and functionality provided by the operating system, dynamic semaphore system API 310 may be required to perform more or less functionality in accordance with the invention.

Figure 4B:
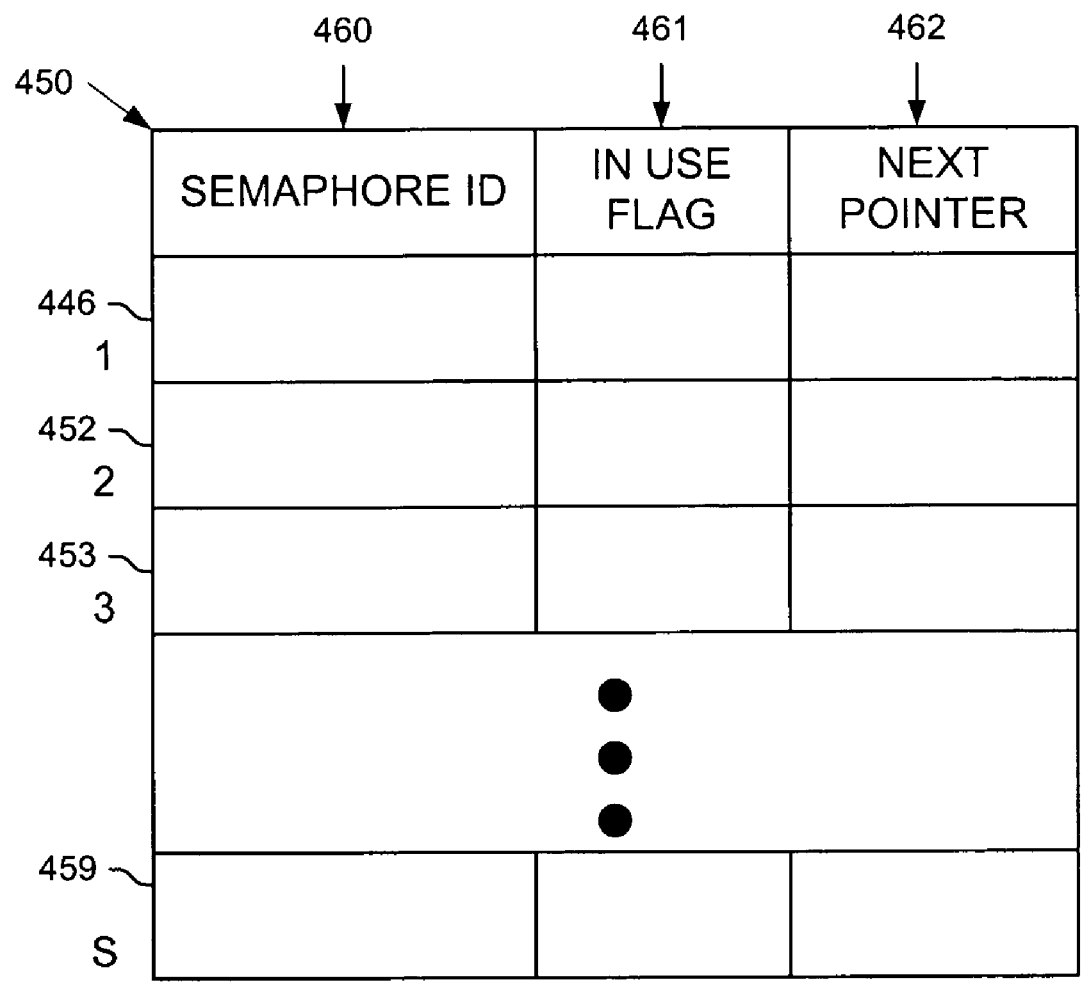
FIG. 4B is a block diagram of an embodiment of a semaphore allocation table.

FIGS. 4A-B illustrate data structures that are used in one embodiment for dynamic allocation and management of semaphores for accessing shared resources. For example, these one or more data structures 400 and 450 may or may not be used by semaphore manager 120 (FIG. 1), semaphore manager 210 (FIG. 1), and or dynamic semaphore system API 310 (FIG. 3) in implementing functionality in accordance with the invention. In one embodiment, a resource lock table data structure 400 (FIG. 4A) is used to identify a particular resource for which access is currently requested, and indexes into semaphore allocation table 450 (FIG. 4B) to identify each particular access request. In one embodiment, the fields and functionality of resource lock table data structure 400 and semaphore allocation table 450 are combined into a single data structure.

As shown in FIG. 4A, resource lock table data structure 400 of one embodiment includes R entries 401-409, each having four fields 410-413. Resource name field 410 is an identifier used to specify the resource for which access is being controlled. For example, in one embodiment such identifiers are character strings (e.g., filename or path) identifying the resource. In other embodiments, resources are given specific unique identifiers for use in their allocation. Lock type field 411 is used to specify the type of access requested or authorized (e.g., exclusive or non-exclusive access such as read or write access). Semaphore index field is used to identify semaphores allocated and stored in semaphore allocation table 450 (FIG. 4B) associated with the resource identified in resource name field 410. Read lock count field 413 is used to count the number of read requests, as in one embodiment, simultaneous read access by multiple consumer tasks are allowed, while only a single write access (with no read access) is allowed at a given time.

As shown in FIG. 4B, semaphore allocation table 450 of one embodiment includes S entries 451-459, each having three fields 460-462. Semaphore identifier field 460 specifies a particular semaphore allocated to a specific access request. One embodiment of a semaphore manager uses semaphores acquired from a pool of semaphores provided by an operating system. In use flag field 461 indicates whether the entry is being used or is part of the free pool of semaphores. Next pointer field 462, in a linked list fashion, indicates NULL or another location within semaphore allocation pool 450 for a next access request to the corresponding resource.

Figure 5A:
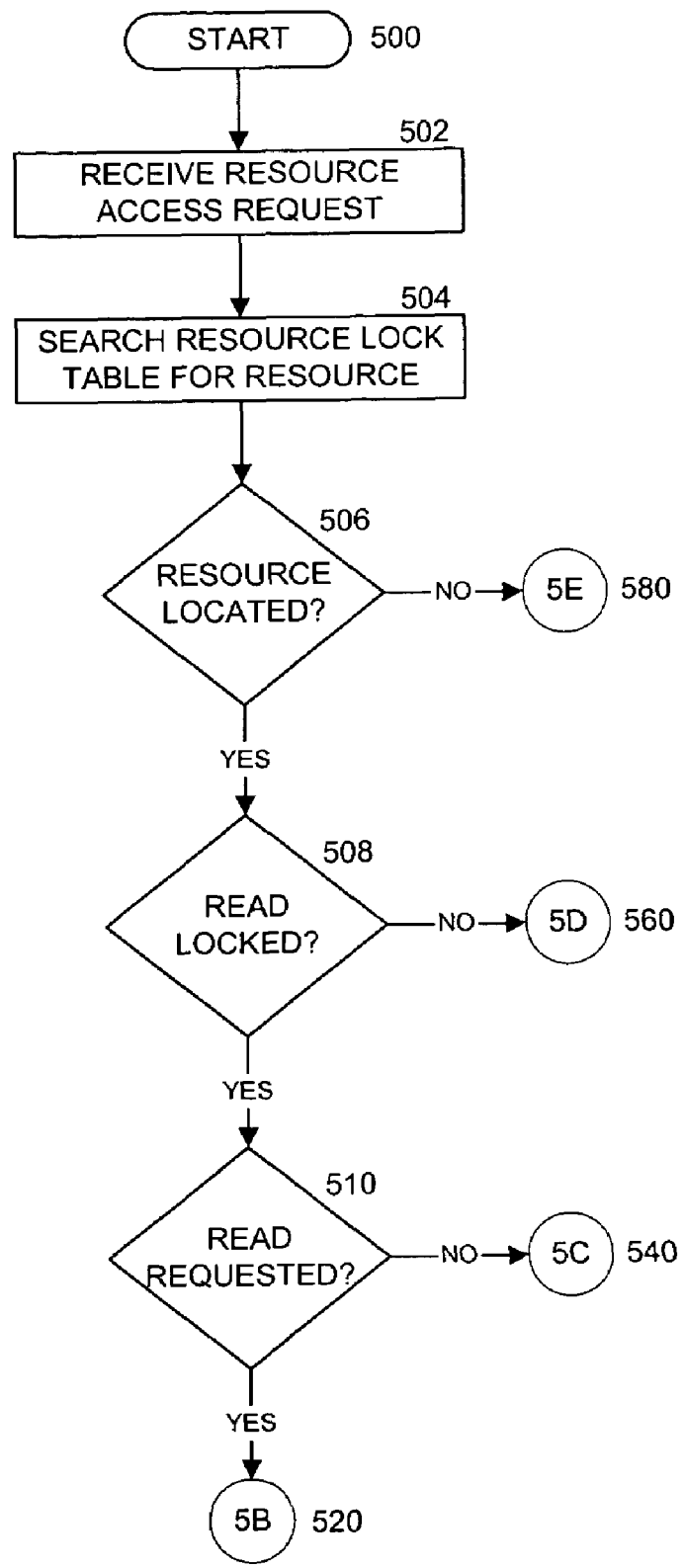
FIGS. 5A-E is a flow diagram illustrating a process of one embodiment for allocating semaphores and authorizing access to resources.

FIGS. 5A-5E illustrate flow diagrams of a process of one embodiment for allocating semaphores and authorizing access to resources. With reference first to FIG. 5A, processing begins at process block 500, and proceeds to process block 502 where a resource access request is received. In process block 504, the resource lock table is searched for the resource. If, as determined in process block 506, the resource was not located (e.g., there is no outstanding access restriction on the resource), then processing proceeds to connector 5E and process block 580 of FIG. 5E, which will now be described. A free entry in the resource lock table is selected in process block 581. Next, in process block 582 the entry is initialized. If the access request corresponds to a read access to the specified resource as determined in process block 584, then processing proceeds to process block 585 to set the number of read accesses in the entry to one, and type of the access to read in process block 586. Otherwise, in process block 588, the type of access is set to write. Next, in process block 590, the resource name (e.g., identifier) is placed in the entry. In process block 592, the requesting consumer task is signaled that the resource is available for the requested operation, and processing is completed as indicated by process block 599.

Figure 5B:
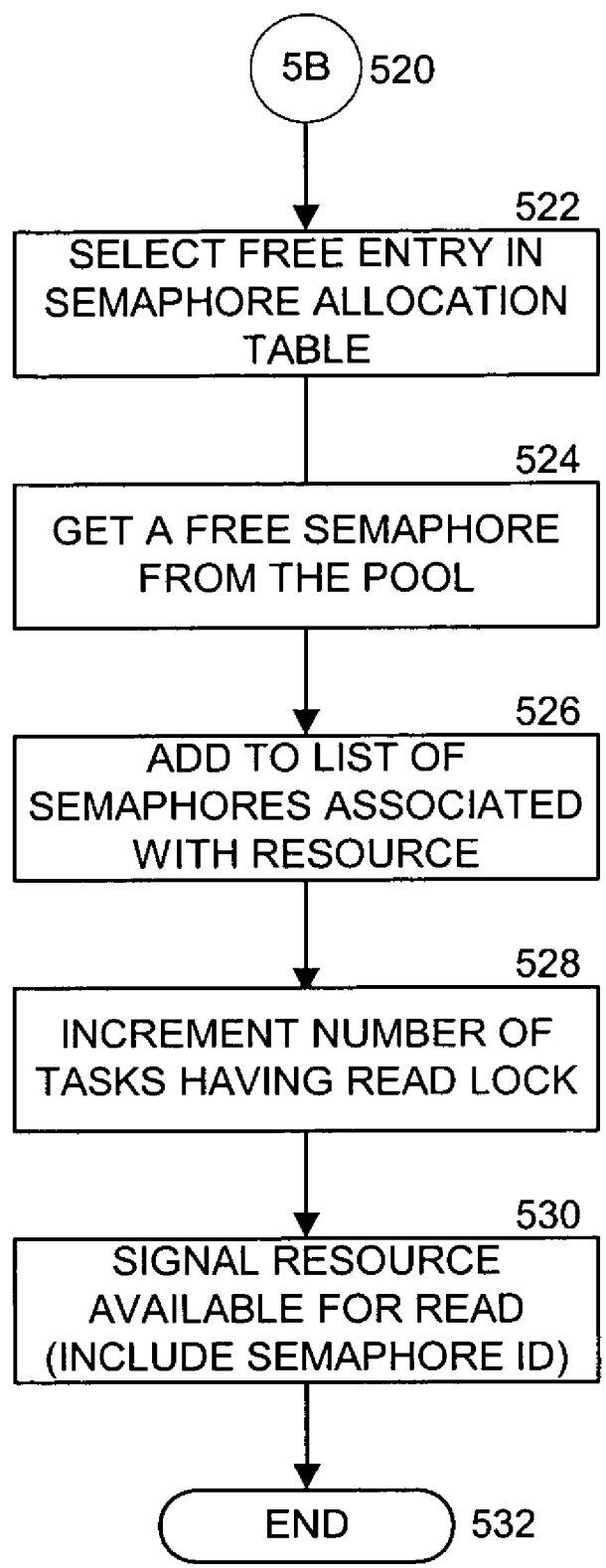

Otherwise, as shown in FIG. 5A, if in process block 506 the resource is determined to have been located, then as determined in process blocks 508 and 510 that the resource is read locked and read access to the resource is requested, then processing proceeds to connector 5B and process block 520 of FIG. 5B, which will now be described. In process block 522, a free entry in the semaphore allocation table is selected, and a semaphore is retrieved from the pool of unused semaphores in process block 524. Next, in process block 526, the semaphore and the new entry (including a reference to the new semaphore) in the semaphore allocation table is added to the list of semaphores associated with the requested resource. In process block 528, the number of tasks having read lock field of the resource lock table is incremented. In process block 530, the consumer task is signaled that read access is allowed, and processing is complete as indicated by process block 532.

Figure 5C:
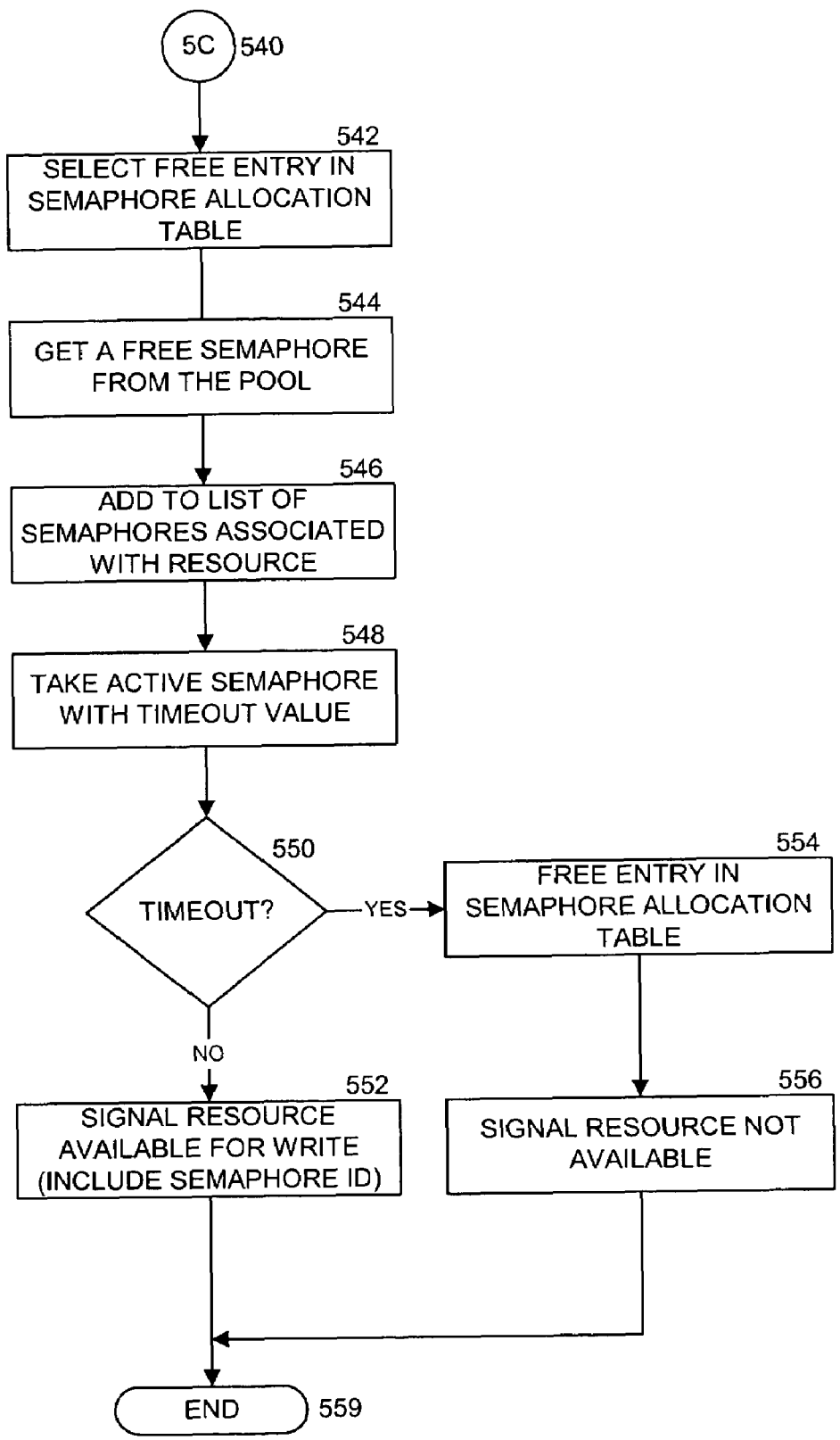

Otherwise, as shown in FIG. 5A, if in process block 506 the resource is determined to have been located, then as determined in process blocks 508 and 510 that the resource is read locked and write access to the resource is requested, then processing proceeds to connector 5C and process block 540 of FIG. 5C, which will now be described. In process block 542, a free entry in the semaphore allocation table is selected, and a free semaphore is retrieved from the pool of semaphores in process block 544. Next, in process block 546, the semaphore and the new entry (including a reference to the new semaphore) in the semaphore allocation table is added to the list of semaphores associated with the requested resource. As the current resource is read locked and write access is requested, in process block 548, the current read semaphore having access control of the desired resource is "taken" or monitored until the resource is freed. If, as determined in process block 550 that a timeout condition was reached while waiting for access to the resource, then the selected entry in the semaphore allocation is freed in process block 554, and the requesting task is signaled that the resource is unavailable in process block 556. Otherwise, the resource has become available and the requesting task is signaled that the resource is available for write access in process block 552. Processing is completed as indicated by process block 559.

Figure 5D:
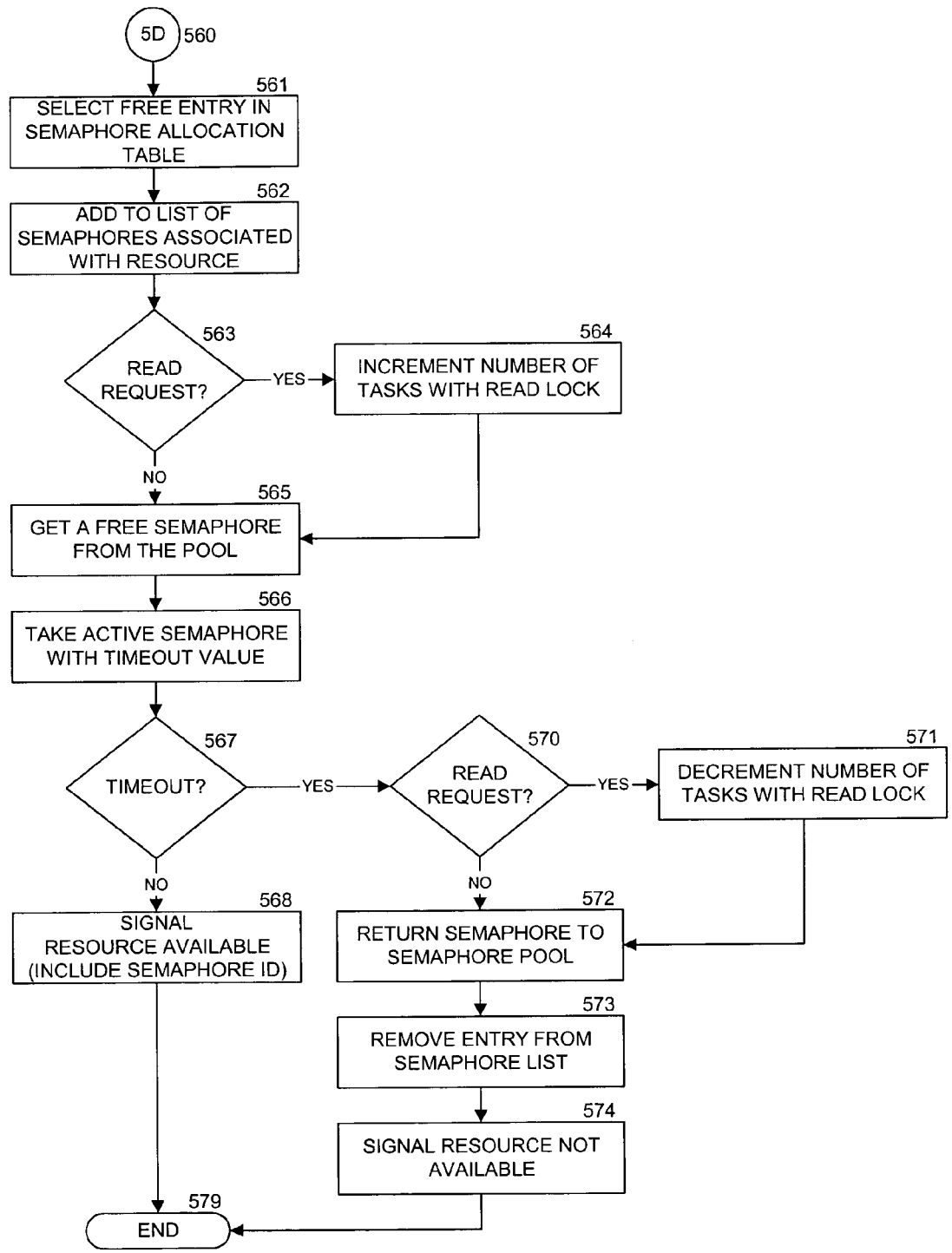
Figure 5E:
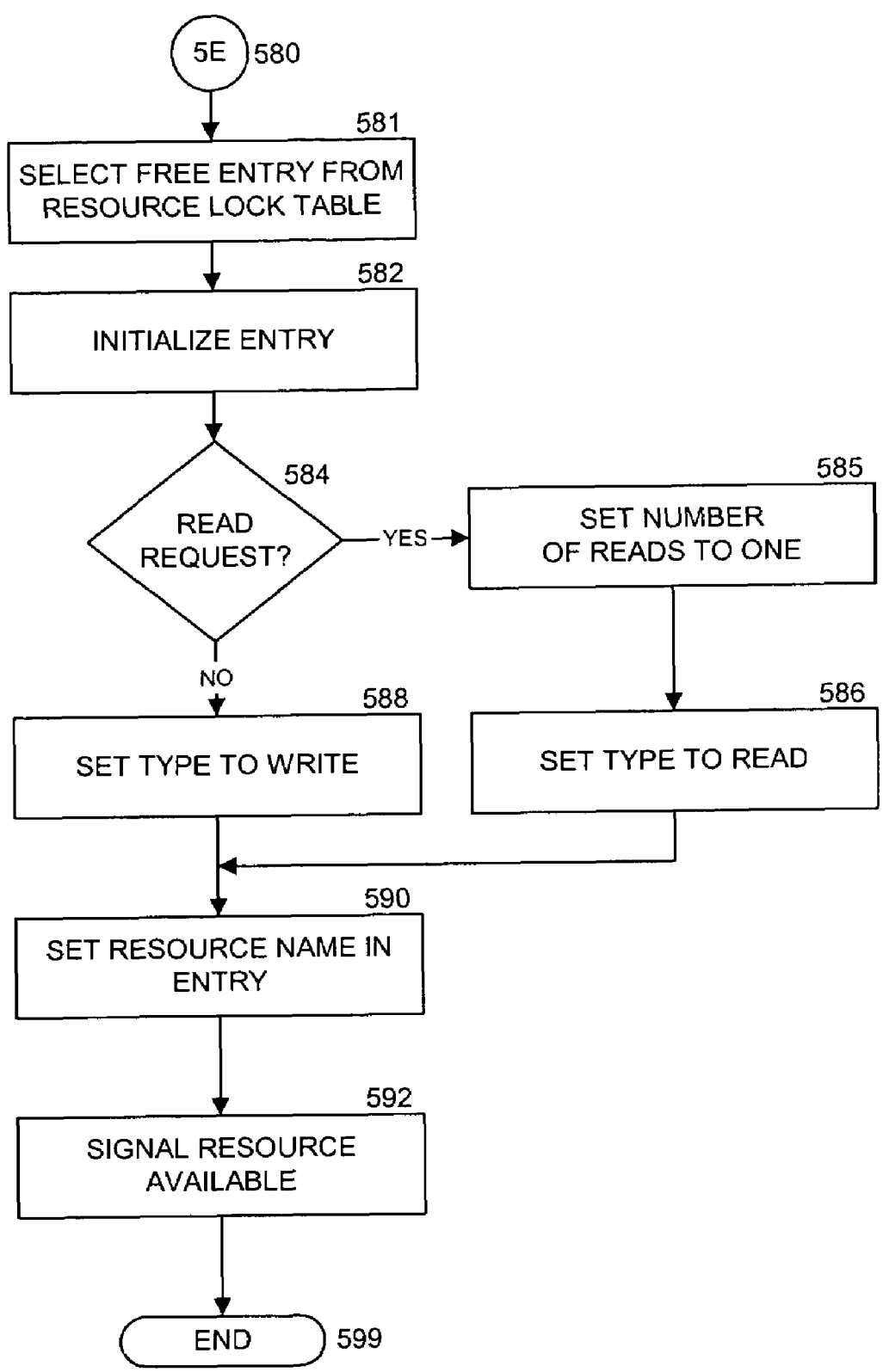

Otherwise, as shown in FIG. 5A, if in process block 506 the resource is determined to have been located, then as determined in process block 508 that the resource is not read locked (e.g., the resource is write locked), then processing proceeds to connector 5D and process block 560 of FIG. 5D, which will now be described. In process block 561, a free entry is selected in the semaphore allocation table. Next, in process block 562, the new entry is added to the list of semaphore entries associated with the resource. If read access has been requested as determined in process block 563, then the number of tasks with read lock is incremented in process block 564. In process block 565, a semaphore is retrieved from the pool of semaphores. Next, in process block 566, the current active semaphore having access control of the desired resource is "taken" or monitored until the resource is freed. If, as determined in process block 567 that the resource has become free and a timeout condition was not reached while waiting for access to the resource, then the requesting consumer task is signaled that access is granted in process block 568. Otherwise, access to the resource is denied and clean-up steps are taken as follows. If read access was requested as determined in process block 570, then the number of tasks with read lock is decremented in process block 571. Otherwise, in process block 572, the allocated semaphore is freed. The selected entry in the semaphore allocation table is freed in process block 573, and the requesting task is signaled that the resource is unavailable in process block 574. Processing is completed as indicated by process block 579.

Figure 6:
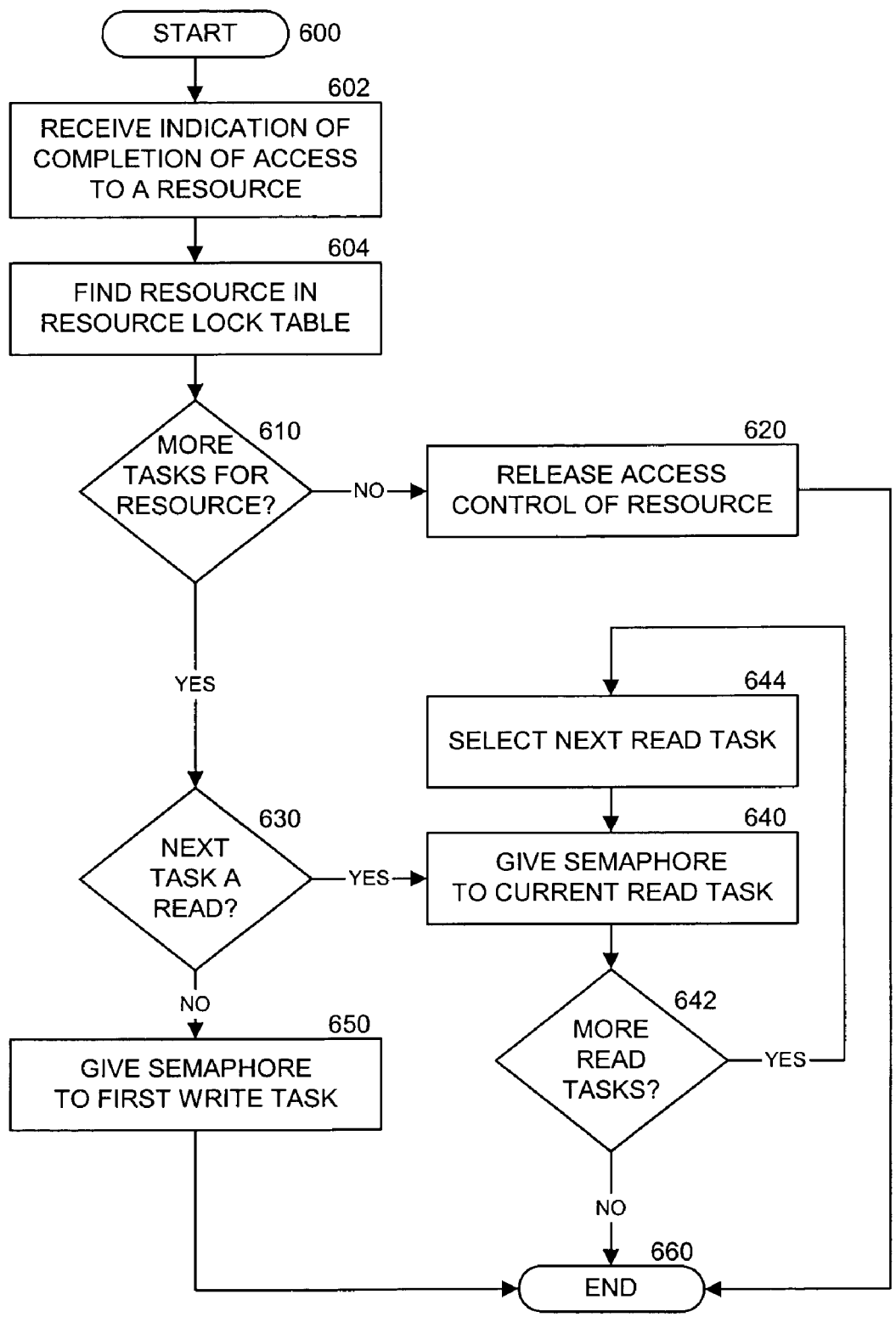
FIG. 6 is a flow diagram illustrating a process of one embodiment for de-allocating semaphores and authorizing access to resources.

Illustrated in FIG. 6 is a flow diagram of a process of one embodiment for de-allocating semaphores and authorizing access to resources. Processing begins at process block 600, and proceeds to process block 602 where a request indicating completion of access to a resource is received. Next, in process block 604, the corresponding resource entry is located in the resource lock table. Next, as determined in process block 610, if there are no more tasks requiring access to the resource, then, in process block 620, the access control of the resource is released by removing the corresponding resource entry in the resource lock table and possibly a corresponding entry from the semaphore allocation table. Otherwise, if the next task (e.g., "next" being defined by a queuing or priority ordering) is for read access as determined in process block 630, then for each read request for the resource identified in the semaphore allocation table, the semaphore is "given" to activate the read request in the loop comprising process blocks 640-644. In one embodiment, the underlying operating system provides a "give" semaphore mechanism to awake a process awaiting availability of a specified semaphore. In another embodiment, the "give" operation is performed by the semaphore manager by signal the waiting requesting task via some inter-task or other communication mechanism. Otherwise, the semaphore for the first write access request is "given" in process block 650 to authorize write access to the corresponding requesting task. Processing is complete as indicated by process block 660.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A computer-implemented method for dynamic allocation and management of semaphores for accessing shared resources, the method comprising:

maintaining a resource lock table data structure indicating for each of a plurality of resources an allocated semaphore of a plurality of semaphores;

maintaining a semaphore allocation table data structure indicating the currently used semaphores for said resources of a plurality of semaphores; and in response to a received resource request for a particular resource from a first task, locating an indication of the particular resource in a particular entry in the resource lock table structure, the particular entry identifying that the particular resource is currently associated with a first semaphore; and in response: getting a second semaphore from a pool of free semaphores, updating a semaphore entry in the semaphore allocation table to reflect that the particular resource is associated with the second semaphore in addition to the first semaphore, and signaling to the first task the availability of the particular resource;

wherein the second semaphore is associated with a timeout value; and wherein the method further comprises: in response to the end of a timeout period corresponding to the timeout value: returning the second semaphore to the pool of free semaphores, updating the semaphore entry in the semaphore allocation table to reflect that the particular resource is no longer associated with the second semaphore, and signaling to the first task that the particular resource is not available; and wherein the received resource request is for read access to the particular resource; and the method further comprises: updating the particular entry in the resource lock table structure to reflect an additional read lock associated with the particular resource; and in response to the end of a timeout period corresponding to the timeout value, updating the particular entry in the resource lock table structure to reflect one less read lock associated with the particular resource.

2. The method of claim 1, wherein the received resource request is for read access to the particular resource; and the method further comprises updating the particular entry in the resource lock table structure to reflect an additional read lock associated with the particular resource.

3. The method of claim 1, where the second semaphore is associated with a timeout value; and wherein said signaling includes signaling to the first task that the particular resource is available before the end of a timeout period corresponding to the timeout value.

4. An apparatus comprising one or more processors and memory, wherein the memory stores one or more instructions that, when executed by said one or more processors, perform operations for dynamic allocation and management of semaphores for accessing shared resources, said operations comprising:

maintaining a resource lock table data structure indicating for each of a plurality of resources an allocated semaphore of a plurality of semaphores;

maintaining a semaphore allocation table data structure indicating the currently used semaphores for said resources of a plurality of semaphores; and in response to a received resource request for a particular resource from a first task, locating an indication of the particular resource in a particular entry in the resource lock table structure, the particular entry identifying that the particular resource is currently associated with a first semaphore; and in response: getting a second semaphore from a pool of free semaphores, updating a semaphore entry in the semaphore allocation table to reflect that the particular resource is associated with the second semaphore in addition to the first semaphore, and signaling to the first task the availability of the particular resource;

wherein the second semaphore is associated with a timeout value; and wherein said operations comprise: in response to the end of a timeout period corresponding to the timeout value: returning the second semaphore to the pool of free semaphores, updating the semaphore entry in the semaphore allocation table to reflect that the particular resource is no longer associated with the second semaphore, and signaling to the first task that the particular resource is not available; and wherein the received resource requests is for read access to the particular resource; and said operations comprise: updating the particular entry in the resource lock table structure to reflect an additional read lock associated with the particular resource; and in response to the end of a timeout period corresponding to the timeout value, updating the particular entry in the resource lock table structure to reflect one less read lock associated with the particular resource.

5. The apparatus of claim 4, wherein the received resource request is for read access to the particular resource; and said operations comprise: updating the particular entry in the resource lock table structure to reflect an additional read lock associated with the particular resource.

6. The apparatus of claim 4, where the second semaphore is associated with a timeout value; and wherein said signaling includes signaling to the first task that the particular resource is available before the end of a timeout period corresponding to the timeout value.

* * * * *